US011356513B2

(12) United States Patent
Dodd-Noble et al.

(10) Patent No.: US 11,356,513 B2
(45) Date of Patent: *Jun. 7, 2022

(54) SELECTING A USER PLANE FUNCTION (UPF) FOR LAYER 2 NETWORKS

(71) Applicant: Cisco Technology, Inc., San Jose, CA (US)

(72) Inventors: Aeneas Sean Dodd-Noble, Andover, MA (US); Om Prakash Suthar, Bolingbrook, IL (US); Ianik Semco, Gatineau (CA)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/024,465

(22) Filed: Sep. 17, 2020

(65) Prior Publication Data
US 2021/0006626 A1    Jan. 7, 2021

Related U.S. Application Data

(63) Continuation of application No. 16/389,420, filed on Apr. 19, 2019, now Pat. No. 10,798,178.
(Continued)

(51) Int. Cl.
H04L 67/14    (2022.01)
H04W 12/08    (2021.01)
(Continued)

(52) U.S. Cl.
CPC .............. H04L 67/14 (2013.01); H04L 63/20 (2013.01); H04W 12/08 (2013.01); H04W 84/042 (2013.01)

(58) Field of Classification Search
CPC ........ H04L 67/14; H04L 63/20; H04W 12/08; H04W 84/042
See application file for complete search history.

(56) References Cited

U.S. PATENT DOCUMENTS 10,165,476 B1 * 12/2018 Yan .................. H04W 36/0033
2017/0332212 A1 * 11/2017 Gage ....................... H04W 4/08
(Continued)

FOREIGN PATENT DOCUMENTS

WO    2018177656 A1    10/2018

OTHER PUBLICATIONS

International Search Report and Written Opinion from the International Searching Authority, dated Apr. 30, 2020, 12 pages, for corresponding International Patent Application No. PCT/US2020/012916.
(Continued)

Primary Examiner — Afshawn M Towfighi
(74) Attorney, Agent, or Firm — Polsinelli PC

(57) ABSTRACT

A network function (NF) entity in a communication network receives User Plane Function (UPF) registration information for a plurality of UPFs, the registration information including a respective network attribute for each UPF. The NF entity associates each UPF with a corresponding network based on the respective network attribute, and map one or more User Equipment (UE) to the corresponding network based on a security policy to create a UE-to-network table. The NF further receives a request to establish a session for a subsequent UE, the request including a subsequent UE identifier, and determine an access permission for the subsequent UE to access the corresponding network based on the subsequent UE identifier and the UE-to-network table. The NF selects one UPF from the plurality of UPF to service the session for the subsequent UE based on the access permission, and an association between the one UPF and the corresponding network.

20 Claims, 9 Drawing Sheets

Related U.S. Application Data

(60) Provisional application No. 62/790,981, filed on Jan. 10, 2019.

(51) Int. Cl.
*H04L 9/40* (2022.01)
*H04W 84/04* (2009.01)

(56) References Cited

U.S. PATENT DOCUMENTS

| | | |
|---|---|---|
| 2017/0332421 A1 | 11/2017 | Sternberg et al. |
| 2018/0199279 A1 | 7/2018 | Baek et al. |
| 2019/0053117 A1 | 2/2019 | Bae et al. |
| 2019/0059067 A1* | 2/2019 | Lee .................. H04L 47/821 |
| 2019/0075431 A1* | 3/2019 | Albasheir ............ H04L 67/101 |
| 2019/0158408 A1* | 5/2019 | Li ..................... H04L 47/20 |
| 2019/0166633 A1* | 5/2019 | Koshimizu ............ H04M 3/00 |
| 2019/0215724 A1* | 7/2019 | Talebi Fard ........ H04L 43/028 |
| 2020/0044879 A1* | 2/2020 | Mirza .................. H04M 15/63 |
| 2020/0120446 A1* | 4/2020 | Stammers ............... H04L 67/16 |
| 2020/0358830 A1* | 11/2020 | Saghir .................. H04L 45/306 |
| 2021/0160768 A1* | 5/2021 | Akman ............... H04L 12/4645 |

OTHER PUBLICATIONS

Nokia, "Solution to Key Issue 2: UPF capabilities advertisement via NRF," 3GPP TSG-SA WG2 Meeting #129, S2-1810777, Oct. 15-19, 2018, 2 pages.

Miyasaka, T., et al., "User Plane Protocol and Architectural Analysis on 3GPP 5G System," draft-hmm-dmm-5g-jplane-analysis-01, Aug. 10, 2018, pp. 1-30.

"3rd Generation partnership Project; Technical Specification Group Services and System Aspects; System Architecture for the 5G System; Stage 2 (Release 15)," 3GPP TS 23.501 V15.2.0 (Jun. 2018), Jun. 19, 2018, pp. 1-217.

3rd Generation partnership Project; Technical Specification Group Services and Systems Aspects; Procedures for the 5G System; Stage 2 (Release 15), 3GPP TS 23.502 v15.2.0 (Jun. 2018), Jun. 2018, 330 pages.

Nokia, "NRF parameters for UDF registration and discovery," C4-184272, May 2018, 22 pages.

* cited by examiner

_SELECTING A USER PLANE FUNCTION (UPF) FOR LAYER 2 NETWORKS_

CROSS REFERENCE TO RELATED APPLICATIONS

This application claims the benefit of, and priority to, U.S. Non-Provisional patent application Ser. No. 16/389,420, filed Apr. 19, 2019, which claims the benefit of U.S. Provisional Patent Application No. 62/790,981, filed Jan. 10, 2019, the full disclosures of which are incorporated herein by reference in their entireties.

TECHNICAL FIELD

The present subject matter relates generally to communication networks, and more particularly, to selecting a User Plane Function (UPF) for layer 2 (L2) networks in telecommunication networks.

BACKGROUND

An ever-increasing consumer demand, improved technological advancements (e.g., hardware/software infrastructure), and industry collaboration has driven significant growth in modern telecommunication networks and continues to drive its evolution. Indeed, each iteration or "next generation" of network capabilities, e.g., represented by standards promulgated by a Third Generation Partnership Project (3GPP), interconnects more devices, improves network bandwidth, increases data-rates, and so on. Recently, a transition is underway from existing 4G networks to new 5G networks, which includes a new service-oriented architecture for provisioning network services/resources in a dynamic, scalable, and customizable fashion (e.g., microservices, network functions virtualization (NFV), etc.).

This service-oriented architecture employs network slices that enable end-to-end partitioned network infrastructures, where logical networks/partitions are created (i.e. network slices) with appropriate isolation and optimized characteristics to serve a particular purpose or service category (e.g. applications with different access and/or functional requirements) or even individual customers (e.g. enterprises, third party service providers). Various 3GPP Technical Specifications (TS(s)) define roles for corresponding Network Functions (NFs) that support network slicing, and in particular, 3GPP TS 23.501 describes general criteria for selecting a User Plane Function (UPF) to serve a given network slice. A UPF generally performs operations such as packet routing and forwarding, packet inspection, QoS handling, mobility anchoring, and generally connecting a User Equipment (UE) to a corresponding data network/network slice. However, while the recent 3GPP Technical Specifications (TS(s)) (e.g., 3GPP TS 23.501) describe general criteria for selecting a User Plane Function (UPF) to serve the UE for a given network/network slice, these criteria fail to consider more granular attributes or even the mechanisms for performing such selections.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
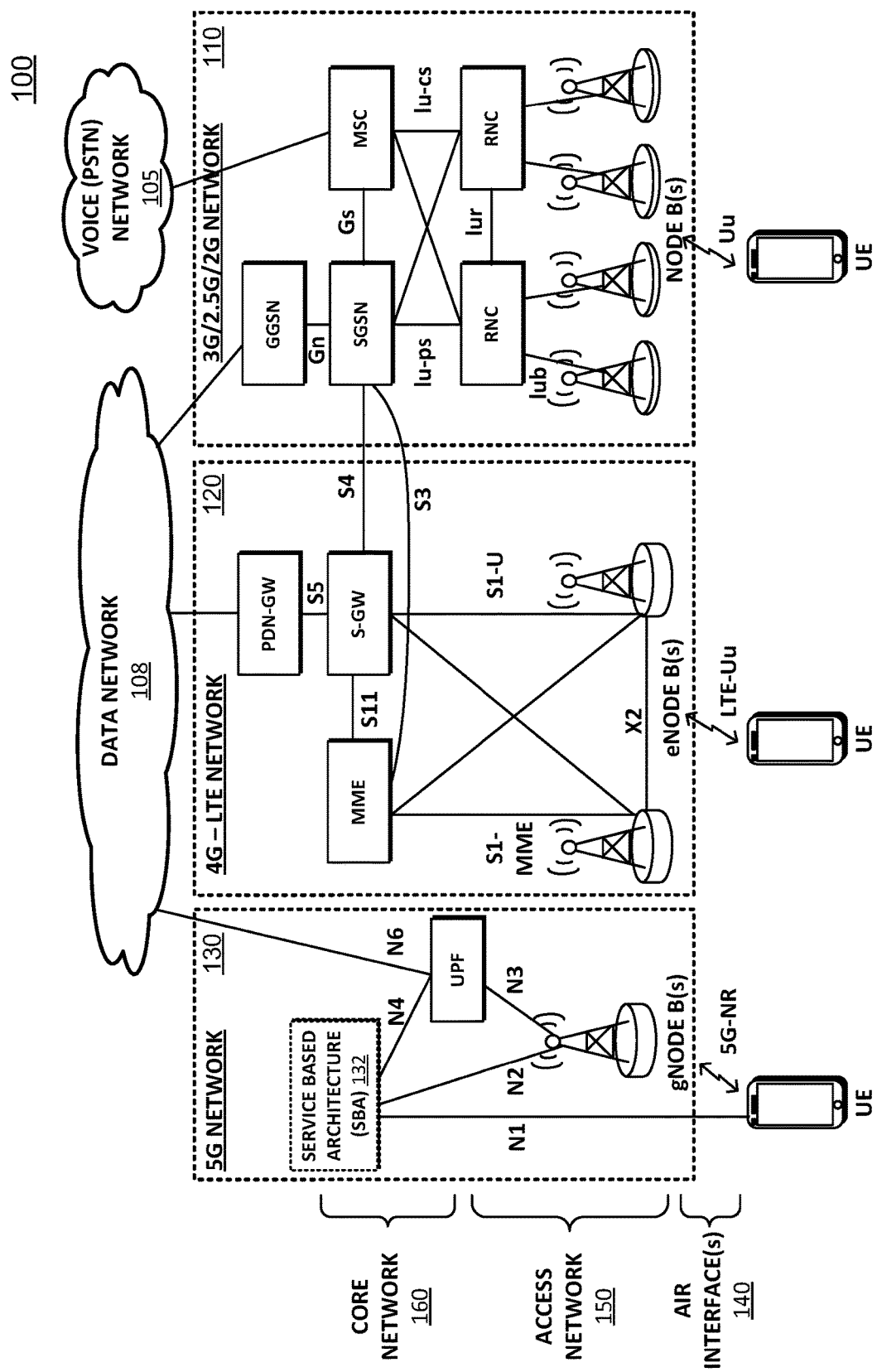
FIG. 1 illustrates a schematic block diagram of exemplary telecommunication networks, including a 3G network, a 4G network, and a 5G network.

This disclosure describes techniques for selecting a User Plane Function (UPF) in a telecommunication network (e.g., 4G/5G networks, etc.) based on an association between UPFs and a data network and a mapping between UEs and the data network (e.g., based on security policies, etc.). The UPF techniques can be executed by a Network Function (NF) entity, which can form part of a core network in a service base architecture (SBA) (e.g., for a 5G network). And in addition, the UPF selection techniques can be executed by a single NF entity, or by multiple NF entities, as is appreciated by those skilled in the art.

According to one example, the NF entity receives User Plane Function (UPF) registration information for a plurality of UPFs, the registration information including a respective network attribute for each UPF. The NF entity associates each UPF with a corresponding network based on the respective network attribute (e.g., VLAN ID). The NF entity, which can include an existing network entity with repository (e.g., UDM/UDR) and/or a new standalone repository, can store a UE-to-network table that maps one or more User Equipment (UE) to the corresponding network based on a security policy. The NF further receives a request to establish a session (e.g., PDU session) for a subsequent UE, where the request includes a subsequent UE identifier. The NF entity determines an access permission for the subsequent UE (e.g., to access the corresponding network) based on the subsequent UE identifier and the UE-to-network table. The NF further selects one UPF from the plurality of UPF to service the session for the subsequent UE based on the access permission, and an association between the one UPF and the corresponding network.

DESCRIPTION

Various examples of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), which include a number of network devices/modules/entities or "Network Function(s)" (NF(s)), as is appreciated by those skilled in the art. In this context, a NF can be implemented either as a network element on a dedicated hardware, as a software instance running on a dedicated hardware, or as a virtualized function instantiated on an appropriate platform, e.g. on a cloud infrastructure. For sake of clarity, the NFs described herein are based on NFs specified by existing Technical Specifications such as the 3GPP TS 23.501, TS 23.502, TS 24.501, TS 29.509, TS 29.518, TS 33.301, TS 33.501, each of which is incorporated herein by reference to its entirety. Moreover, while some operations and functionality may be described and/or attributed to a particular NF, it is appreciated that such operations are not intended to be limited to the particular NF, but may be performed by other NFs as appropriate, particularly in view of the ongoing development and evolving nature of telecommunication networks.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

FIG. 1 illustrates a schematic block diagram of exemplary telecommunication networks 100, including a 3G network 110, a 4G network 120, and 5G network 130. Telecommunication networks 100 include wireless network interfaces or communication links, such as air interfaces 140, an access network 150, which represents radio infrastructure or radio towers, and a core network 160, which represents respective core network entities, network modules, or Network Functions (NF(s)). The wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 100, including respective interconnected network entities, are illustrated and described herein for purposes of discussion, not limitation, and it is appreciated that the illustrated networks can include (or exclude) any number of network entities, communication links, and the like, and can support inter-network operability and compatibility.

Access network 150 represents the infrastructure or radio towers, such as a Radio Access Network (RAN), for receiving and transmitting data packets between end user nodes (UE) as well as the various network entities (e.g., core network entities). Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks.

Respective network entities that form core network 160 (within the telecommunication networks 100) operatively connect respective RAN infrastructure (NBs, eNBs, gNBs) to third party networks such as a voice network 105 (e.g., a Public Switched Telephone Network (PSTN) network) and/or a data network 108 to create end-to-end connections. Prior to 3G (e.g., 2G, 2.5G, etc.) the third party network primarily included a voice network/PSTN 105 (e.g., a circuit switched network). From 3G onward, the third party network transitioned to include a public network (e.g., the Internet), represented by data network 108 (e.g., a packet switched network). Core network 160 and its respective network entities collectively operate to manage connections, bandwidth, and mobility for respective UE.

Notably, core network 160 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 110, session management includes a standalone General Packet Radio Service (GPRS) network, while 4G network 120 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

5G network 130, as discussed herein, introduces a new service base architecture (SBA) 132, which generally redistributes functionality of 4G network entities into smaller service-based functions/network entities. In addition, packet routing and forwarding functions (which are performed by SGW and PGW in 4G network 120) are realized as services rendered through a new network function/entity called the User Plane Function (UPF). In this fashion, 5G network 130 provides a modular set of services that support dynamic and scalable deployment of resources to satisfy diverse user demands.

Figure 2:
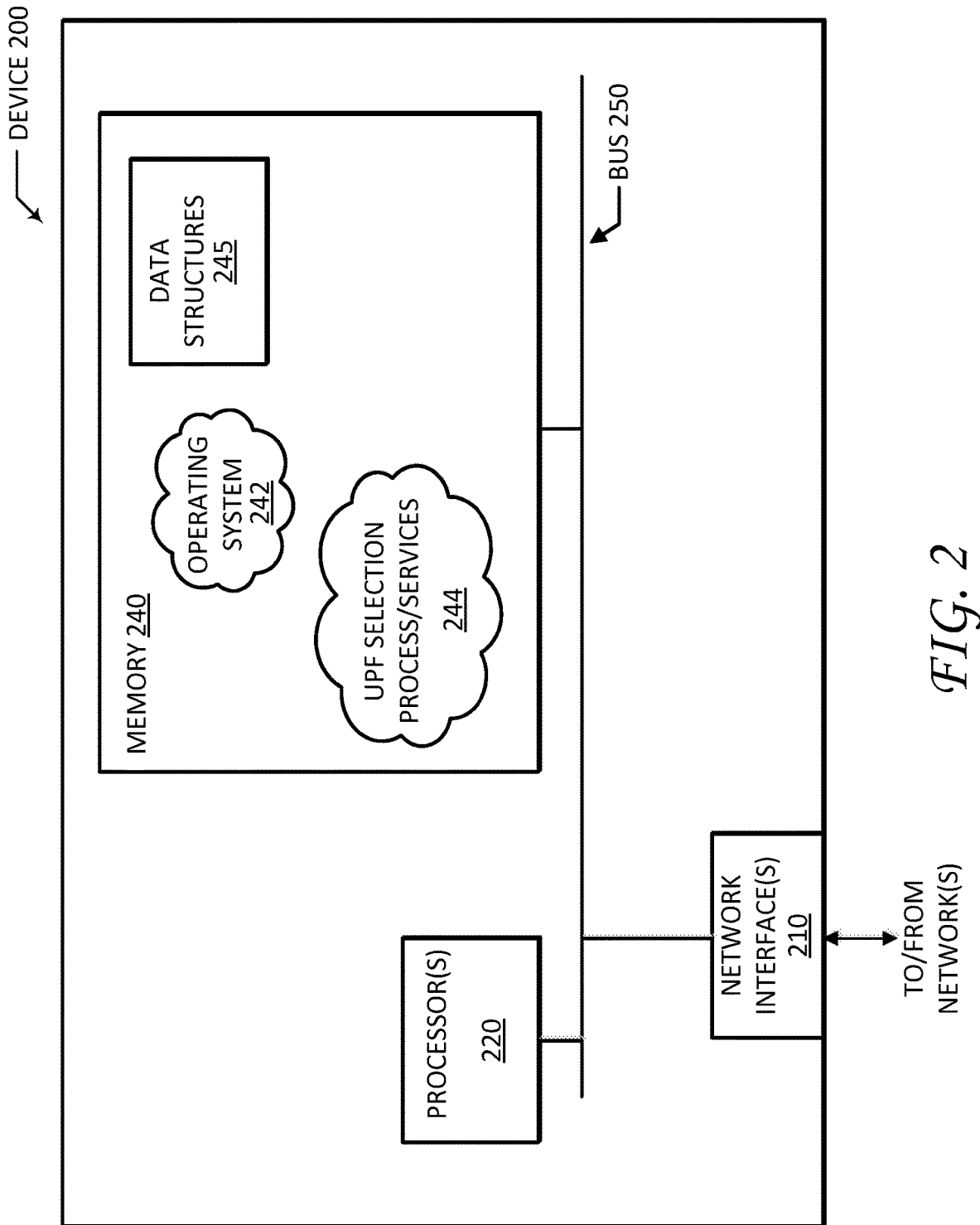
FIG. 2 illustrates a schematic block diagram of an exemplary network device, such as a Network Function (NF) entity/module, according to one or more embodiments of this disclosure.

FIG. 2 illustrates a schematic block diagram of an exemplary network device or Network Function (NF) 200 that may be used with one or more examples described herein. For example, device 200 can represent a network entity such as a Session Management Function (SMF), a Policy Control Function (PCF), a Unified Data Management (UDM), and/or other NFs within SBA 132.

The illustrative device 200 comprises one or more network interfaces 210, at least one processor 220, and a memory 240 interconnected by a system bus 250. Network interface(s) 210 contain the mechanical, electrical, and signaling circuitry for communicating data over links (e.g., wires or wireless links) within the telecommunication networks 100 (e.g., ref. FIG. 1). Network interfaces 210 may be configured to transmit and/or receive data using a variety of different communication protocols, as will be understood by those skilled in the art.

Memory 240 comprises a plurality of storage locations that are addressable by processor 220 for storing software programs and data structures associated with the examples described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of services and/or software processes executing on the device. These services and/or software processes may comprise an illustrative "UPF selection" process/service 244, as described herein. Note that while processes/services 244 are shown in centralized memory 240, some examples provide for these processes/services to be operated as part of a distributed communication network, as is appreciated by those skilled in the art.

Illustratively, the techniques described herein may be performed by hardware, software, and/or firmware, such as in accordance with the illustrative UPF selection process 244, which may contain computer executable instructions executed by processor 220 to perform functions relating to selecting a User Plane Function to serve a User Equipment (UE) for a given network/network slice, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3A:
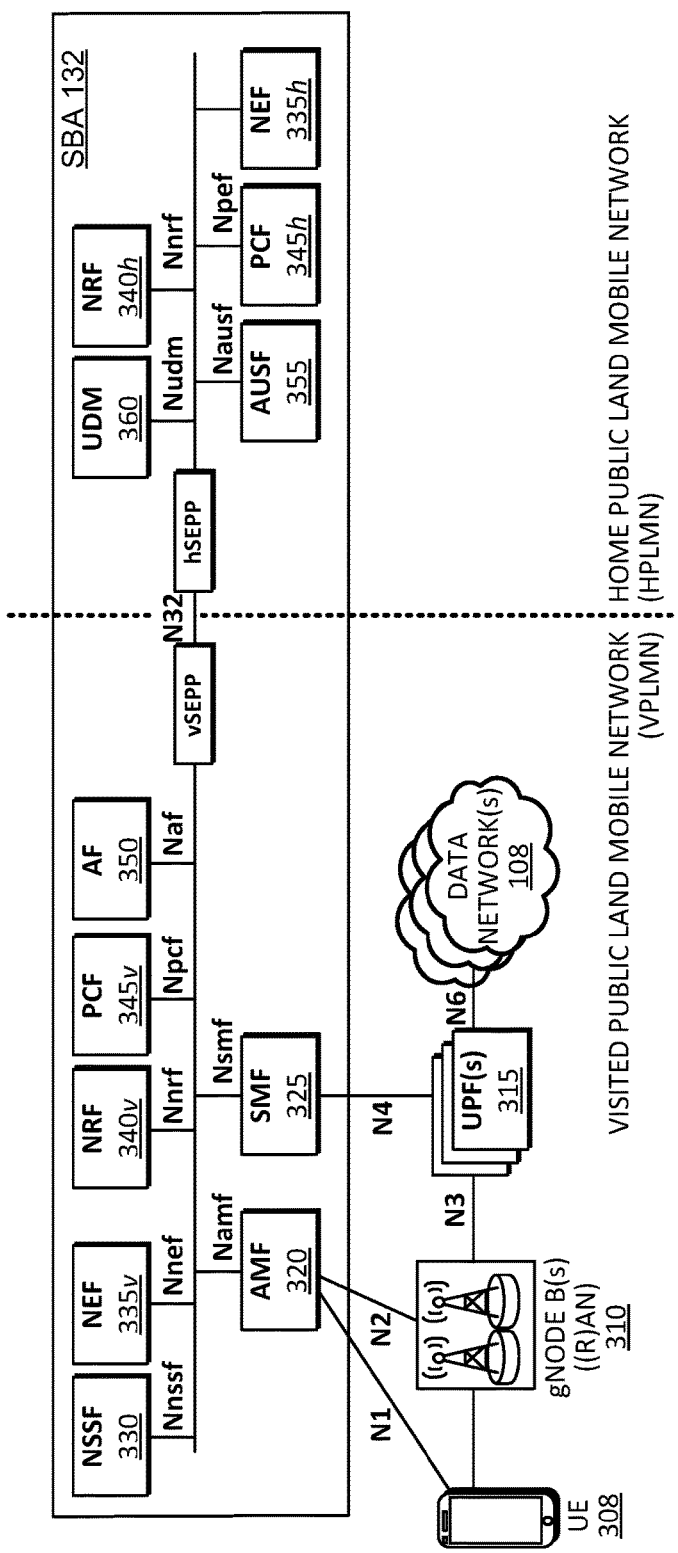
FIG. 3A illustrates schematic block diagram of a roaming architecture with a local breakout scenario for a service based interface representation of a Service Based Architecture (SBA)
Figure 3B:
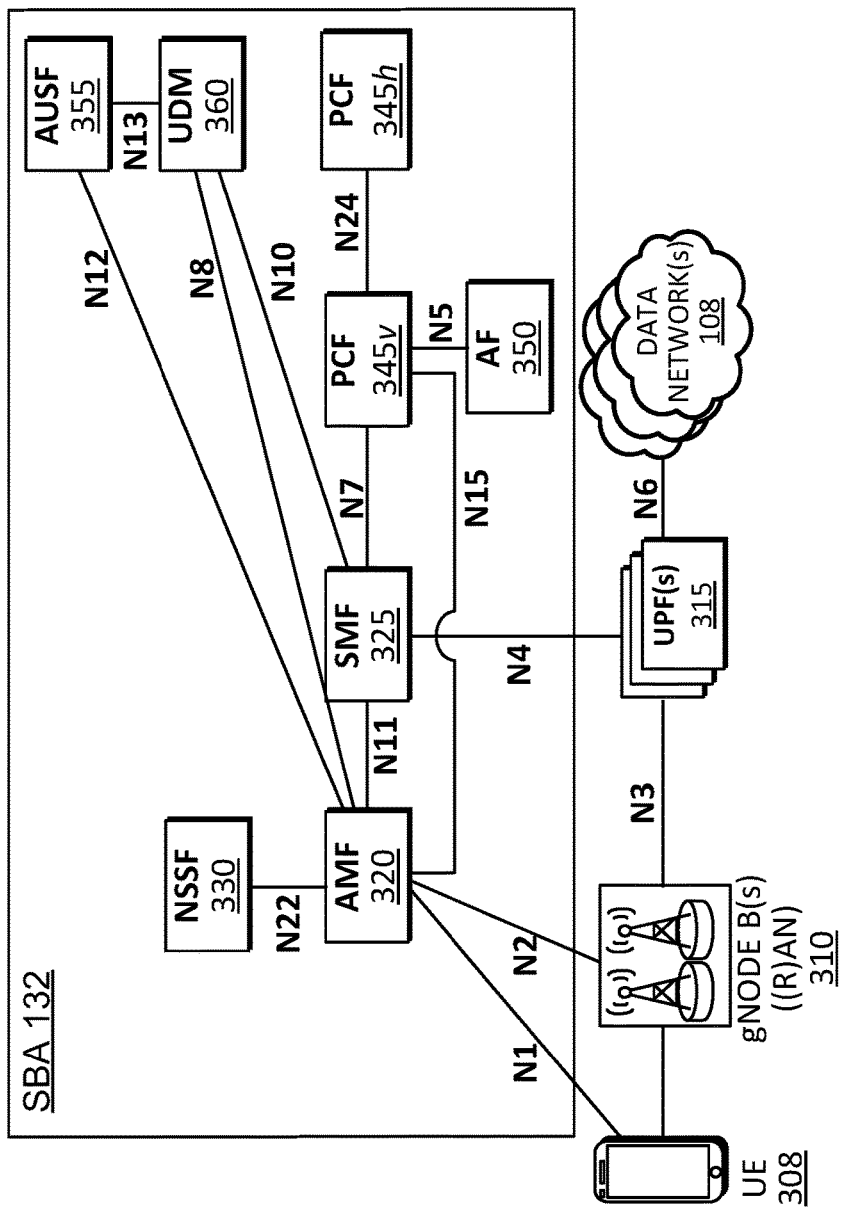
FIG. 3B illustrates a schematic block diagram of a reference point representation of the SBA shown in FIG. 3A.

FIG. 3A illustrates a schematic block diagram 301, showing a roaming SBA architecture (e.g., SBA 132) for a local breakout scenario in a service-based interface representation of an exemplary network (e.g., 5G network 130), and FIG. 3B illustrates a schematic block diagram 302, showing an example reference point architecture for the SBA architecture.

With respect to schematic block diagram 301, roaming generally refers to situations where the UE from one network (e.g., a home network) operates in another network (e.g., a visiting network). Typical roaming networks can include, for example, an Internet Protocol (IP) Packet eXchange (IPX) Network for 4G and 5G technologies, which is an inter-Service Provider IP backbone that includes interconnected networks of IPX Providers. For 2G and 3G technologies, General Packet Radio Service (GPRS) Roaming eXchange (GRX) is used to provide roaming capabilities. Both GRX and IPX networks operably exchange IP based traffic between customers of separate mobile and fixed operators as well as other types of service provider (such as ISP), via IP based Network-to-Network Interface. Specifications for roaming networks can be defined by GSMA guidelines such as IR.34 guidelines for IPX provider networks, the contents of which are incorporated herein by reference to its entirety.

The roaming architecture shown in schematic block diagram 301 includes a Visited Public Land Mobile Network (VPLMN) and a Home Public Land Mobile Network (HPLMN). A Public Land Mobile Network (PLMN) is a network established and operated by a carrier for providing mobile communication services to its subscribers. Generally, domestic subscribers for a carrier use roaming if to receive services from abroad. A HPLMN refers to the subscriber's home network (e.g., domestic carrier) while VPLMN refers to the subscriber's abroad network (where the UE may be registered while roaming). Notably, Security Proxies (SEPPs) (e.g., vSEPP/hSEPP) operably protect interactions between the PLMNs.

While FIG. 3A illustrates the roaming architecture with the local breakout scenario, it is appreciated other roaming architectures may be employed (e.g., home routing, etc.). Further, as shown here, some network entities such as the Session Management Function (SMF) and the User Plane Function(s) (UPF(s)) involved in a PDU session are under the control of the VPLMN.

As shown, various network entities that form SBA 132 including, for example, AMF 320, SMF 325, Network Slice Selection Function (NSSF) 330, Network Exposure Function (NEF) 335v 335h, Network Repository Function (NRF) 340v 340h, Policy Control Function (PCF) 345v 345h, and Application Function (AF) 350, an Authentication Server Function 355, and a Unified Data Management 360. These network entities can be implemented either as a network element on a dedicated hardware, as a software instance running on a dedicated hardware, or as a virtualized function instantiated on an appropriate platform, e.g., a cloud infrastructure, as is appreciated by those skilled in the art.

In general, UE 308 connects to RAN/Access Network (AN) 310 as well as AMF 320. Here, the RAN can include a base station while the AN can include a base station supporting non-3GPP access, e.g., Wi-Fi access. AMF 320 provides UE-based authentication, authorization, mobility management, etc. SMF 325 is responsible for session management, IP address allocation to UE(s), and traffic management/selection of a User Plane Function (UPF) (e.g., UPF 315) for proper routing/data transfer to corresponding data network(s) 108. Notably, if UE 308 has multiple sessions, different SMFs may be allocated to each session for individual management and/or different functionality per session.

AF 350 generally provides information on packet flows to PCF 345v, which is responsible for policy control in order to support Quality of Service (QoS), and PCF 345v determines policies about mobility and session management for proper AMF/SMF operations. AUSF 355 stores authentication data for UE 308, and UDM 360 stores subscription data for UE 308. Data network 108 provides Internet access or operator services.

UDM 360 is responsible for services related to users and subscriptions. For example, UDM 360 can generate 3GPP AKA authentication credentials, handle user identification related information, manage access authorization (e.g. roaming restrictions), register the user serving NFs (serving AMF, Session Management Function (SMF)), support service continuity by keeping record of SMF/Data Network Name (DNN) assignments, support Lawful Interception (LI) procedures in outbound roaming by acting as a contact point and performs subscription management procedures, and so on.

The foregoing operations (and additional functionality) for respective network entities can be found in 3GPP Technical Specification (TS) 23.501 v 15.2.0 and TS 23.502v15.2.0, which is incorporated by herein by reference to its entirety.

FIG. 3B illustrates a schematic block diagram 302, showing a reference point interface representation of SBA 132 (e.g., with a local breakout (LBO) scenario). Reference point representations help develop detailed call flows in a normative standardization, which are further illustrated in FIGS. 5A, 5B, and 5C, described in greater detail below. It should be noted, for sake of clarity, certain network entities (e.g., NEF 335, NRF 340, etc.) are not illustrated in schematic block diagram 302. However, it is appreciated any of the illustrated network entities can interact with the non-illustrated entities as appropriate.

As illustrated, N1 carries signaling between UE 308 and AMF 320. The reference points for connecting between (R)AN 310 and AMF 320 and between (R)AN 310 and UPF 315 are defined as N2 and N3, respectively. There is a reference point, N11, between AMF 320 and SMF 325. In this fashion, SMF 325 may be controlled by AMF 320. N4 is used by SMF 325 and UPF 315 so that the UPF 315 can be set using the control signal generated by the SMF 325, and the UPF 315 can report its state to the SMF 325. PCF 345 applies policy to AMF 320 and SMF 325 over N15 and N7, respectively. AMF 320 uses N12 to perform authentication of UE 308. N8 and N10 provide subscription data of UE 308 from UDM 360 to AMF 320 and SMF 325. Additional reference points are illustrated and can generally operate in accordance with 3GPP specifications, as is appreciated by those skilled in the art.

In proper context, and with reference to FIG. 3A and FIG. 3B, various network entities cooperate to register and attach UE 308 to SBA 132, to select and establish an appropriate UPF (e.g., UPF 315) for a PDU session based on UE mobility and connectivity related events (e.g., for a particular network slice, etc.)

PDU sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. This connectivity service can include multiple PDU sessions, which are logical associations created between the 5G core network entities (e.g., SBA 132) and UE 308 to handle data packet exchanges. In the context of a 5G network, session management is flexible, scalable, and accommodates various service continuity modes (e.g., "make before break" options, relocation of core network functions, etc.) while maintaining seamless end-user services. The session management also supports concurrent local and central access to a data network and multi-access edge computing where an application at an edge data centre can influence traffic routing to improve its performance.

While session management is illustrated and described in the context of 5G networks (e.g., PDU sessions), it is appreciated such session management and related operations can readily apply to 4G networks (e.g., PDN sessions, etc.) For example, as is appreciated by those skilled in the art, 4G networks create sessions using default data bearers (e.g., 4G networks), while the 5G networks establish a PDU session as-needed or on demand, independent of UE attachment procedures. Further, UE(s) can establish multiple PDU sessions to the same data network (or to different data networks) over a single or multiple access networks (e.g., 3GPP networks, non-3GPP networks, etc.) where each PDU session is associated with network slice—e.g., one S-Network Slice Selection Assistance Information (S-NSSAI) and one Data Network Name (DNN). Notably, the PDU sessions can include various session types (e.g., IPv4, IPv6, Ethernet, unstructured, etc.)

In operation, UE 308 initiates session establishment by sending a PDU session request data to AMF 320 (e.g., as part of a PDU Session Establishment Request message). Notably, when UE 308 attaches to the core network (e.g., SBA 132), UE 308 exchanges mobility management messages and session management messages with AMF 320 (e.g., over an NG1 NAS network interface). Session management messages can be transmitted with the mobility management message supported by the NAS routing capability within AMF 320. Although AMF 320 is involved in sending session management messages, processing mobility messages and session management messages typically occurs in AMF 320 and SMF 325, respectively.

AMF 320 receives the PDU session request and discovers/selects an appropriate SMF (e.g., SMF 325) based on parameters included in the initial PDU session request from UE 308, such as session management service identification data, Single Network Slice Selection Assistance Information (S-NSSAI) data, Data Network Name (DNN) data, UE subscriptions, local operator policies, etc.). Although AMF 320 may not understand the full context of the session management messages, it can still determine/select an appropriate SMF for a new PDU session based on the above-mentioned parameters.

Here, AMF 320 selects SMF 325 and establishes a PDU session, which allocates PDU resources for a relevant network slice and permits data transmission/data packet exchanges between UE 308 and data network 108. In addition, AMF 320 also ensures that NAS signaling associated with this PDU session is handled by the same SMF (SMF 325) by assigning a PDU session identifier to the PDU session. UE 308, in turn, uses this PDU session identifier to route messages to the correct SMF.

As mentioned, PDU sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. Subscription information for each S-NSSAI can include multiple DNNs and one default DNN. When UE 308 does not specify a DNN in a NAS Message containing PDU Session Establishment Request for a given S-NSSAI, the serving AMF determines the DNN for the requested PDU Session by selecting the default DNN for this S-NSSAI if a default DNN is present in the UE's Subscription Information; otherwise the serving AMF selects a locally configured DNN for this S-NSSAI. If the DNN provided by the UE is not supported by the network and AMF cannot select an SMF by querying NRF, the AMF may reject the NAS Message containing PDU Session Establishment Request from the UE with a cause indicating that the DNN is not supported.

Each PDU Session typically supports a single PDU Session type, e.g., the exchange of a single type of PDU requested by UE 308 at the establishment of the PDU Session. PDU Sessions are generally established upon UE request, modified upon UE 308/SBA 132 request, and released upon UE 308/SBA 132 request using NAS session management signaling exchanged over the N1 network interface between UE 308 and SMF 325. SBA 132 is able to trigger a specific application in UE 308 based on a request from an Application Server. UE 308 receives a trigger message and passes it to an appropriate application executing in UE 308. The application in UE 308 may establish a PDU Session to a specific DNN, in accordance with 3GPP TS 32.501, clause 4.4.5.

SMF 325 is responsible of checking whether UE requests are compliant with the user subscription. For this purpose, SMF 325 retrieves and requests to receive update notifications on SMF level subscription data from UDM 360. This subscription data can indicate (e.g., per DNN and per S-NSSAI) allowed PDU Session Types and the default PDU Session Type, allowed SSC modes and the default SSC mode, QoS Information, subscribed Session-AMBR, Default 5QI and Default ARP, static IP address/prefix, subscribed User Plane Security Policy, Charging Characteristics to be associated with the PDU Session, and so on.

In addition, UE 308 may request to move a PDU Session between 3GPP and Non 3GPP accesses. The decision to move PDU Sessions between 3GPP access and Non 3GPP access is made on a per PDU Session basis, e.g., UE 308 may, at a given time, have some PDU Sessions using 3GPP access while other PDU Sessions are using Non 3GPP access. UE 308 typically provides a PDU session ID in a PDU Session Establishment Request message. The PDU session ID is unique per UE and represents a unique identifier assigned to a PDU Session. The PDU session ID can be stored in UDM 360 to support handover between 3GPP and non-3GPP access—e.g., when different PLMNs are used for the two accesses.

As noted above, a transition is currently underway from existing 4G networks to new 5G networks, which includes a new service-oriented architecture (e.g., SBA 132—FIG. 1), which employs network slices to dynamically and logically partition or isolate networks. While the recent 3GPP Technical Specifications (TS(s)) describe general criteria for selecting a User Plane Function (UPF) to serve the UE for a given network/network slice, these criteria fail to consider more granular attributes, such as Layer 2 (L2) attributes, when selecting different networks/network slices (e.g., Virtual Local Area Networks (VLANs) within the same Data Name Network (DNN), etc.). Accordingly, the techniques described herein provide new processes to improve UPF selection, particularly for L2 networks. These new processes also provide mechanisms and describe operations for various Network Functions (NFs) in SBA 132 to perform such UPF selections.

Figure 4:
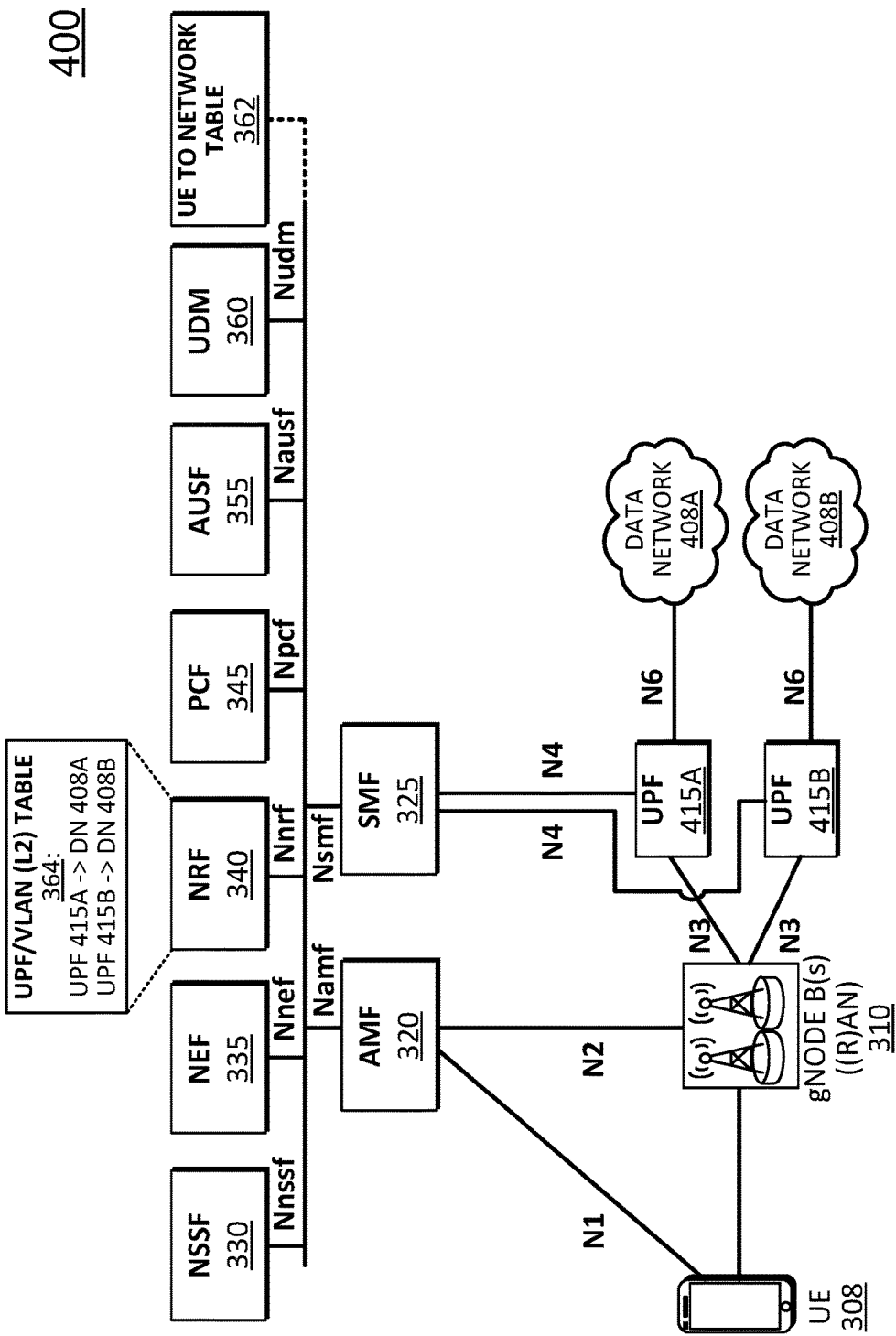
FIG. 4 illustrates a schematic block diagram of a hybrid representation of the SBA shown in FIGS. 3A and 3B, showing various NFs cooperating to perform the UPF selection techniques according to one example of this disclosure.

Referring again to the figures, FIG. 4 illustrates a schematic block diagram 400 of a hybrid representation of SBA 132, showing operations by various NFs to perform the UPF selection techniques according to one example of this disclosure.

In particular, the UPF selection techniques begin when a UPF registers with an NRF, using, for example, registration processes described in 3GPP TS 23.502 (e.g., "Nnrf_NF-Management_NFRegister" signaling, bulk provisioning of a UPF by a Local Access Network (LAN) management system, and so on).

Importantly, as part of the registration request, the UPF(s) provide an additional network attribute (e.g., an L2 network ID (VLAN ID), a broadcast domain, a Media Access Control (MAC) address, a spanning tree configuration, etc.) that indicates its support for a corresponding data network or network(s). For example, when UPF 415A and UPF 415B initially register with NRF 340, they each provide respective L2 network attributes that indicate support for corresponding data networks—here, UPF 415A and UPF 415B provide NRF 340 with network attribute corresponding to Virtual Local Access Network (VLAN) support to indicate UPF 415A supports or serves data network 408A and UPF 415B supports or serves data network 408B. This VLAN or layer-2 capability can be included as part of (or a new) UPF/DNN attribute, such as the NF Profile attributes described in 3GPP TS 29.510. As is appreciated by those skilled in the art, VLANs can be identified by unique identifiers (e.g., VLAN IDs), and multiple VLANs can belong to the same Data Network Name (DNN). As shown, data network 408A and data network 408B represent different VLANs, which define different domains of trust and/or different domains of relationships between devices. In addition, while each UPF is illustrated as supporting a single data network, it is appreciated that a single UPF can support more than one network.

NRF 340 receives respective registration information from UPF 415A and UPF 415B, including the respective network attribute (e.g., VLAN support, VLAN type, VLAN ID, etc.), and stores this information in a UPF-to-network table, such as the illustrated UPF/VLAN table 364. Notably, UPF/VLAN table 364 is shown for purposes of illustration, not limitation. UPF/VLAN table 364 represents a mapping or an association between UPF(s) (e.g., UPF 415A/UPF 415B) and respective data networks. For example, UPF/VLAN table 364 can map a UPF to a corresponding VLAN ID. It is appreciated that the information represented by UPF/VLAN table 364 can be stored by NRF 340 in any number of forms (not necessarily a table), and/or in some examples, the information may be locally stored by SMF 325, PCF 345, AUSF 355, UDM 360, or any of the other NFs shown in diagram 400. In operation, various NFs (e.g., SMF 325) can query NRF 340 as part of a lookup operation, where the NF provides a VLAN ID, and NRF 340 returns the UPF associated with the VLAN ID.

For example, in operation, UPF 415A and UPF 415B can provide a new network attributes to indicate the specific VLAN it supports as part of the Nnrf NFManagement NFStatusNotify signaling set forth in section 4.17.6.2. Here, UPF 415A and 415B provide a list of S-NSSAI, DNN, VLAN IDs (indicating VLAN support), SMF area identities that the UPF can serve, and the like, when registering with NRF 340. In turn, NRF 340 can store this information in a UPF/VLAN table 364, and further provide such information to appropriate NFs as part of its Nnrf NFManagement signaling and/or as part of a subsequent UPF discovery process.

When UE 308 begins an attach procedure (e.g., as described in 3GPP TS 23.502), UE 308 sends registration requests to AMF 320 through RAN 310. During an initial registration, AMF 320 can initiate a UE identity request, e.g., when AMF 320 is new to UE 308, and/or when AMF 320 was not provided Subscriber Concealed Identifier (SUCI) information from prior AMF(s). UE 308 provides a corresponding identity response, which can include a SUCI or privacy preserving identifier containing a concealed subscriber permanent identifier (SUPI)).

AMF 320 further selects SMF 325 to establish a PDU session for UE 308, which allocates PDU resources for a relevant network slice and permits data transmission/data packet exchanges between UE 308 and data network 108. In particular, SMF 325 selects an appropriate UPF (e.g., UPF 415A/UPF 415B). In addition to the UPF selection procedures described in 3GPP TS 23.502, SMF 325 determines an appropriate UPF for the PDU session based on a UE/network table 362 as well as the UPF/VLAN (L2) table 364. For example, SMF 325 determines the appropriate network for the UE based on the UPF/VLAN table 364, which indicates an access permission for UEs to a corresponding L2 network. SMF 325 then selects a UPF that serves the corresponding L2 network for the UE based on the UPF/VLAN table 364.

Notably, UE/network table 362 represents an association or mapping between a UE and a Layer 2 (L2) network (e.g., VLAN, etc.). This association can include mapping UE attributes with network attributes, including VLAN information (VLAN ID), MAC addresses, UE subscription data, General Public Subscription ID(s) (GPSI(s)), SUPI(s), and so on. UPF/VLAN table 364 can be initially created based on a pre-defined security policy and stored by a new standalone Network Function (NF) or by an existing NF/repository/database/etc.

In some examples, UE/network table 362 can form part of a new Network Function (NF) such as a repository, which may be directly or indirectly accessible by the various NFs of SBA 132. In other examples, the information represented by UE/network table 362 may be stored in a Unified Data Repository (UDR), which is accessible by UDM 360, and/or stored locally by SMF 325, and/or stored by an application external to the NFs of SBA 132.

In one example, SMF 325 receives a UE identifier, which can include a SUPI associated with UE 308 as part of a PDU session establishment procedure. SMF 325 further queries UDM 360 based on the SUPI to retrieve network access information for UE 308, which can include a VLAN ID. In this fashion, SMF 325 can lookup and determine appropriate access permission between UE 308 and a corresponding network based on UE/network table 362. SMF 325 further looks up or matches the corresponding network to a UPF based on UPF/VLAN table 364 (which maps UPFs to corresponding networks), and further selects one of UPF 415A or UPF 415B to serve UE 308 and connect UE 308 to the corresponding data network 408A or data network 408B.

If UE 308 moves, SMF 325 can determine whether an intermediate UPF or I-UPF is needed, and/or if the same UPF (PDU Session Anchor (PSA)) can move based on the UE/network table 362.

Figure 5A:
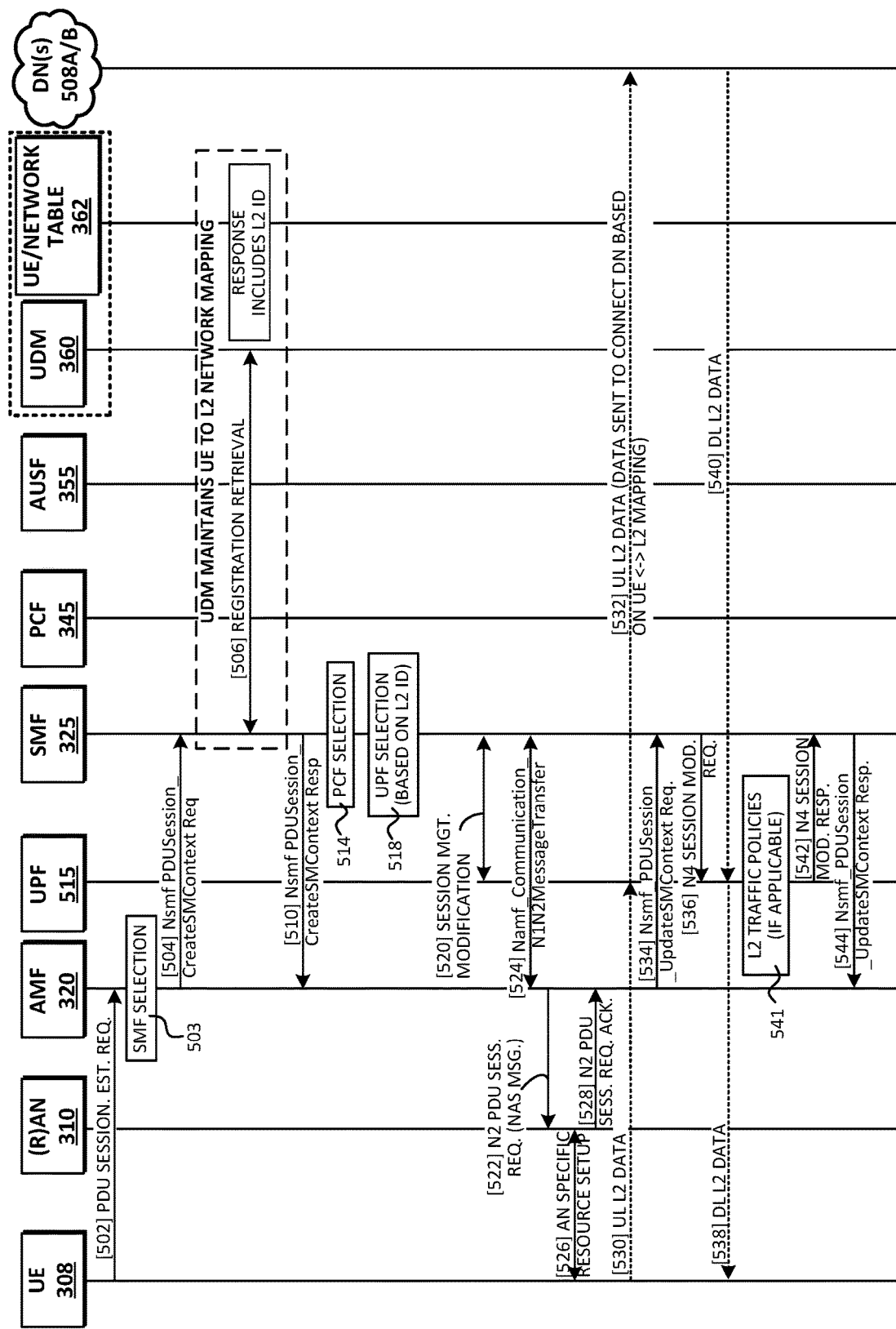
FIG. 5A illustrates a schematic signaling diagram of call flows for a UPF selection procedure, showing a Session Management Function (SMF) selecting a UPF based on a Layer 2 (L2) network attributes retrieved from a Unified Data Management network entity.
Figure 5B:
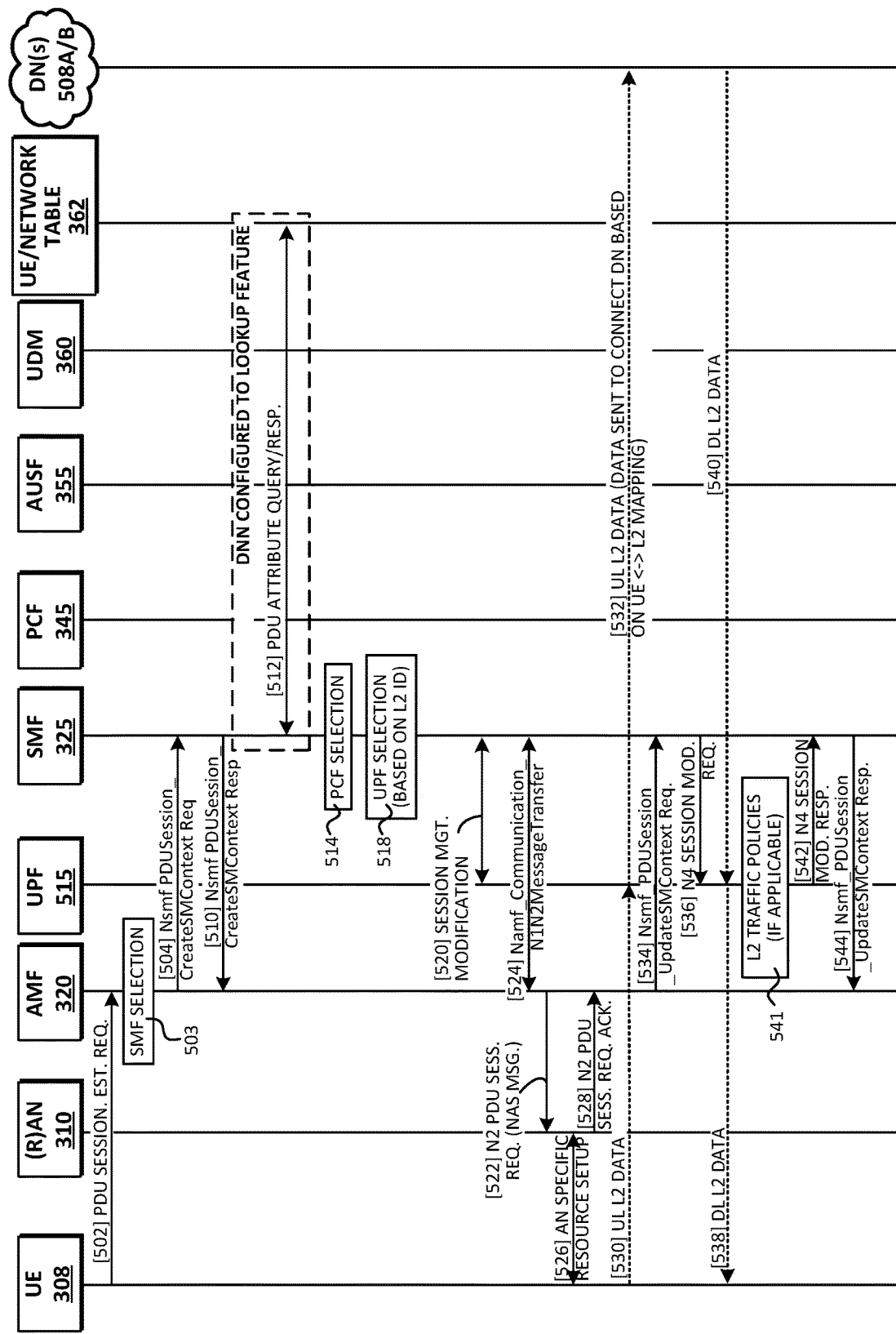
FIG. 5B illustrates another schematic signaling diagram of call flows for a UPF selection procedure, showing the SMF selecting the UPF based on externally retrieved L2 network attributes.
Figure 5C:
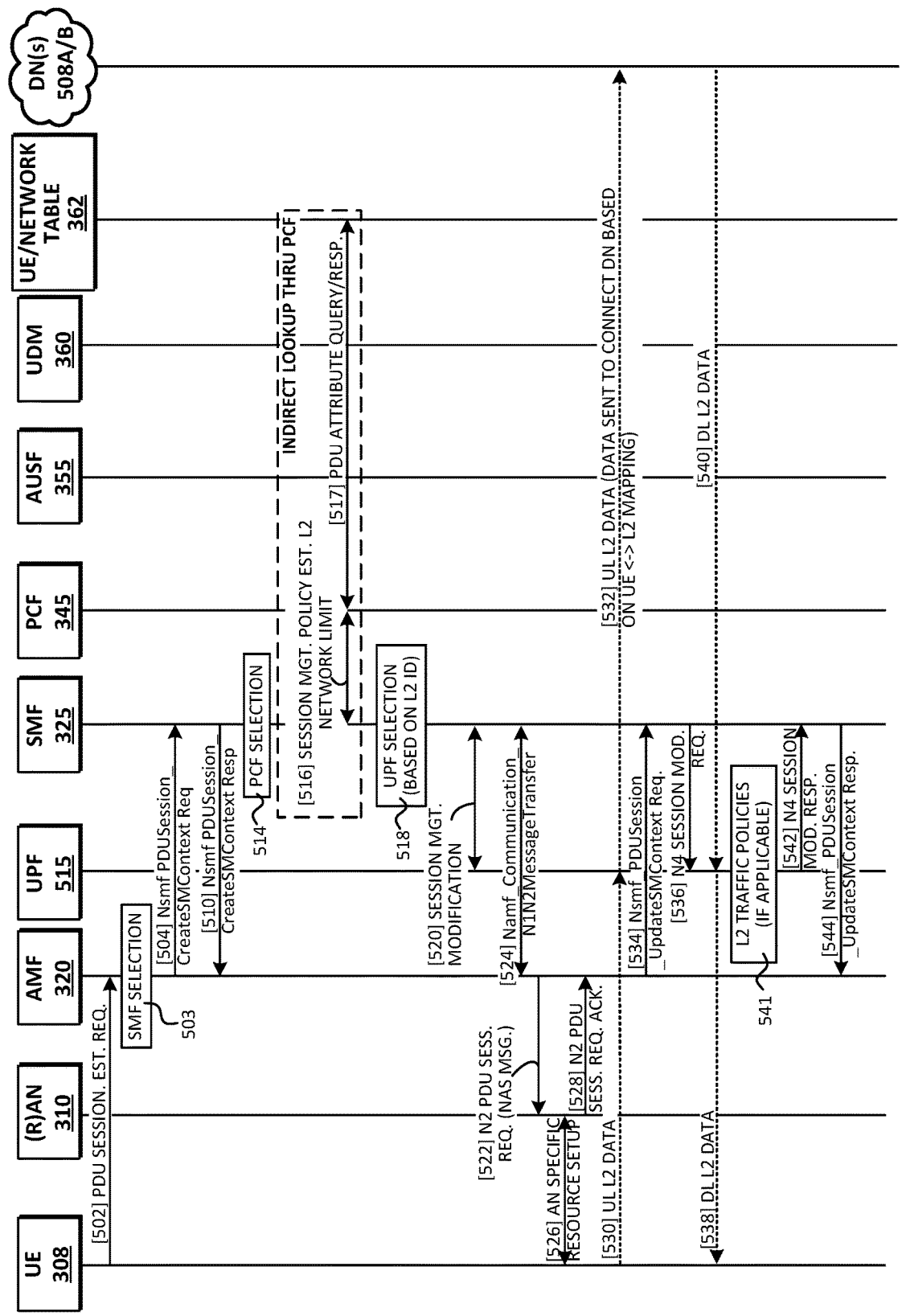
FIG. 5C illustrates another schematic signaling diagram of call flows for a UPF selection procedure, showing the SMF selecting the UPF based on L2 network attributes indirectly retrieved by a Policy Control Function (PCF)

The foregoing operations are further described with respect to the signaling diagrams and call flows illustrated in FIGS. 5A, 5B, and 5C.

Notably, the signaling and call flows discussed below do not show an initial UPF registration process where a UPF registers with the NRF and indicates support for a corresponding network (e.g., VLAN, etc.) However, it is appreciated that the UPF can perform a registration process in accordance with 3GPP TS 23.502 (e.g., section 4.17.6), which, as discussed above, such registration process can be further modified such that the UPF provides network attributes indicating a specific network (e.g., VLAN) it supports (e.g., as part of the Nnrf NFManagement NFStatusNotify signaling set forth in section 4.17.6.2).

For example, during the initial registration with the NRF, the UPF can provide a list of S-NSSAI, DNN, VLAN IDs (indicating VLAN support), SMF area identities that the UPF can serve, and the like. In turn, the NRF can create UE/network table 362, and provide the UPF/VLAN mapping information in subsequent notify messages to various NFs (e.g., AMF, SMF, PCF, NEF, NSSF, SMSF, AUSF, etc.)—e.g., as part of a return notify message. As one example, the UpfInfo definitions such as UpfInfoList can be modified to include additional UPF supported interfaces (e.g., interface UpfInfoList). While the UpfInfo definition (e.g., UpfInfoItem) currently supports IPv4 or IPv6 interfaces, the definition could be expanded to readily indicate VLAN support as part of a UpfInterfaceType.

Referring again to the figures, FIG. 5A illustrates a schematic signaling diagram of call flows between various Network Functions (NFs) for performing the disclosed UPF selection procedure. Here, SMF 325 selects a UPF 515 based on Layer 2 (L2) network attributes retrieved from UDM 360 (e.g., which may be further stored in a Unified Data Repository (UDR) accessible by UDM 360).

As shown, the call flows begins at step 502, where UE 308 sends a PDU session establishment request to AMF 320. The session establishment request can information such as Single Network Slice Selection Assistance Information (S-NSSAI), Data Network Name (DNN), PDU session IDs, request types, old PDU session IDs, an N1 Service Management (SM) container, indications/requests a secondary authorization, and so on.

AMF 320 receives the session establishment request and further discovers/selects an appropriate SMF at step 503. For example, AMF 320 discovers and selects SMF 325 based on parameters included in the initial PDU session request (e.g., step 502). As mentioned, these parameters include S-NSSAI data, DNN data, UE subscriptions, local operator policies, authentication data, and so on.

If AMF 320 does not have an association with an SMF for the PDU session ID (e.g., when Request Type indicates "initial request"), AMF 320 invokes a PDU session creation request (e.g., Nsmf PDUSession CreateSMContext Request), as shown at step 504. However, if AMF 320 already has an association with an SMF for the PDU Session ID (e.g., when Request Type indicates "existing PDU Session"), the AMF invokes the Nsmf PDUSession UpdateSMContext Request.

At step 506, SMF 325 and UDM 360 exchange registration/subscription information for UE 308. As mentioned, SMF 325 is responsible of checking whether UE requests are compliant with the user subscription. SMF 325 retrieves and requests to receive update notifications on SMF level subscription data from UDM 360. This subscription data can indicate (e.g., per DNN and per S-NSSAI) allowed PDU Session Types and the default PDU Session Type, allowed SSC modes and the default SSC mode, QoS Information, subscribed Session-AMBR, Default 5QI and Default ARP, static IP address/prefix, subscribed User Plane Security Policy, Charging Characteristics to be associated with the PDU Session, and so on.

In addition, UDM 360 also stores, maintains, or otherwise has access to a UE/network table 362 (e.g., in a Unit Data Repository (UDR) or other database). As part of the information exchange with SMF 325, UDM 360 returns mapping information that indicates an association between UE 308 and a corresponding network—e.g., data network (DN) 508A or data network 508B. Notably, UEs can be mapped to corresponding data networks based on security policies, and this mapping can include, for example, a UE identifier (e.g., Media Access Control (MAC), etc.) mapped or associated with a particular network identifier (e.g., VLAN ID). In addition, UDM 360 can access and query the relevant repository or database that stores UE/network table 362 with, for example, a Lightweight Directory Access Protocol (LDAP), or the like.

In this fashion, the signaling represented by step 506 generally operates to register SMF 325 for an initial PDU session with UDM 360, in accordance with a UE-requested PDU Session Establishment procedure described by 3GPP TS 23.502, which is modified to further return mapping information from UE/network table 362 to SMF 325. At step 510, SMF 325 sends a corresponding PDU session SM context response (e.g., an SM context identifier) to AMF 320.

UE 308 is attached to the network at step 510, but it does not have an IP address assigned, nor does UE 308 have access to any of the data networks 508A/508B. At step 514, SMF 325 selects PCF 345 based on a PDU profile, and PCF 345/SMF 325 further perform the Session Management Policy Establishment procedures defined in TS 23.501. For example, SMF 325 establishes the PDU Session with PCF 345, such that SMF 325 receives default PCC Rules for the PDU Session, PCF 345 subscribes to IP allocation/release events in SMF 325, PCF 345 updates policy information in SMF 325, and so on.

After selecting PCF 345, SMF 325 further selects, at step 518, a UPF (e.g., UPF 515) to serve the PDU session based on the Layer 2 (L2) network attribute (e.g., VLAN ID). Recall, SMF 325 received mapping information from UE/network table 362 at step 506 (above), which indicates UE 308 is mapped to a particular network (e.g., data network 508A). For example, the mapping information from UE/network table 362 can indicate whether UE 308 has access permission to the particular network. Here, SMF 325 determines that UE 308 has proper access permission for data network 508A.

In addition, SMF 325 further determines and selects the UPF associated with/mapped to data network 508A. For example, SMF 325 particularly determines which UPF is associated with data network 508A based on initial registration information that the UPF(s) provided to the NRF (discussed above). Notably, this initial registration information can be stored by the NRF (e.g., UPF/VLAN table 364), where each UPF provides a VLAN ID or other network attribute to indicate that the given UPF supports or serves a particular network.

As shown, SMF 325 determines that UPF 515 serves or supports data network 508A based on its initial registration data with the NRF (not shown). In some examples, SMF 325 determines that UPF 515 serves data network 508A as part of a UPF discovery process (e.g., where SMF 325 exchanges signals with the NRF to discover UPFs serving data network 508A). In other examples, the initial registration data can be stored locally by SMF 325, as is appreciated by those skilled in the art. In this fashion, at step 518, SMF 325 determines UE 308 has access permission to data network 508A, and SMF 325 further determines data network 508A is mapped to or associated with UPF 515. SMF 325 selects UPF 515 based on the same.

Remaining steps 520-544, may be performed in accordance with by 3GPP TS 23.502, as is appreciated by those skilled in the art. Notably, at step 532, UPF 515 provides bridging layer 2 PDU from UE with layer 2 network on SGi side for applications. In addition, at step 541, L2 traffic policies for data network 508A are applied and enforced by UPF 515.

FIG. 5B illustrates another schematic signaling diagram of call flows for a UPF selection procedure. Notably, many of the signals or steps are the same to those discussed above with respect to FIG. 5A. However, here, SMF 325 selects the UPF based on externally retrieved L2 network attributes, as shown by step 512.

In particular, after UE 308 is attached to the network at step 510, SMF 325 is configured to perform an external query to obtain the mapping information from UE/network table 362. For example, SMF 325 can query the database for PDU attributes to determine whether UE 308 has access permission to data network 508A. The query can return a VLAN ID, a broadcast domain, and so on (e.g., similar to how RADIUS returns frame routes or virtual APNs, etc.)

SMF 325 further selects PCF 345 at step 514, and continues to select the appropriate UPF (here, UPF 515) at step 518. As discussed above, SMF 325 determines UE 308 has access permission to data network 508A at the prior step 512, and SMF 325 further determines (at step 518) that UPF 515 serves or supports data network 508A and selects UPF 515 based on the same. Remaining steps 520-544, may be performed in accordance with by 3GPP TS 23.502, as is appreciated by those skilled in the art.

FIG. 5C illustrates another schematic signaling diagram of call flows for a UPF selection procedure. Again, many of the signals or steps are the same to those discussed above with respect to FIG. 5A/5B. However, here, SMF 325 selects UPF 515 based on L2network attributes indirectly retrieved by PCF 345.

In particular, after SMF 325 selects PCF 345, SMF 325 further sends, at step 516, a session management policy signal to PCF 345 requesting subscriber profile information, which can include L2 network attributes (e.g., VLAN ID, etc.) for UE 308. PCF 345 receives the signal from SMF 325, and queries (e.g., using LDAP, etc.) UE/network table 362 for UE policy entitlements, authorizations, and/or access permission to data network 508A. Notably, UE/network table 362 may be stored at UDM 360, at a corresponding UDR, or at an equivalent database/server (e.g., AAA server, etc.).

SMF 325 further selects UPF 515 at step 518. As discussed, SMF 325 determines UE 308 has access permission to data network 508A (steps 516/517), and SMF 325 further determines (at step 518) that UPF 515 serves or supports data network 508A and selects UPF 515 based on the same. Remaining steps 520-544, may be performed in accordance with by 3GPP TS 23.502, as is appreciated by those skilled in the art.

Collectively, the signaling diagrams shown in FIGS. 5A, 5B, and 5C illustrate variations of the disclosed UPF selection procedure, where prior to providing UE access to a given network, the SMF confirms that the UE has appropriate access permissions to the given network, and then selects the proper UPF based on the same. As described above, the SMF selects the UPF based on two forms of mapping—first, the SMF determines whether the UE has access permission to the given network based on the mapping information from UE/network table 362, and second, the SMF determines the appropriate UPF that serves the given network based on the UPF's initial registration data (e.g., provided to the NRF).

Notably, once selected, the UPF identifies user plane traffic flow based on information received from the SMF over the N4 reference point. The UPF can be selected, instantiated and/or otherwise provisioned on a dynamic basis. In this fashion, the UPF can be implemented as a cloud native network function using modern microservices methodologies and deployable within a serverless framework.

Figure 6:
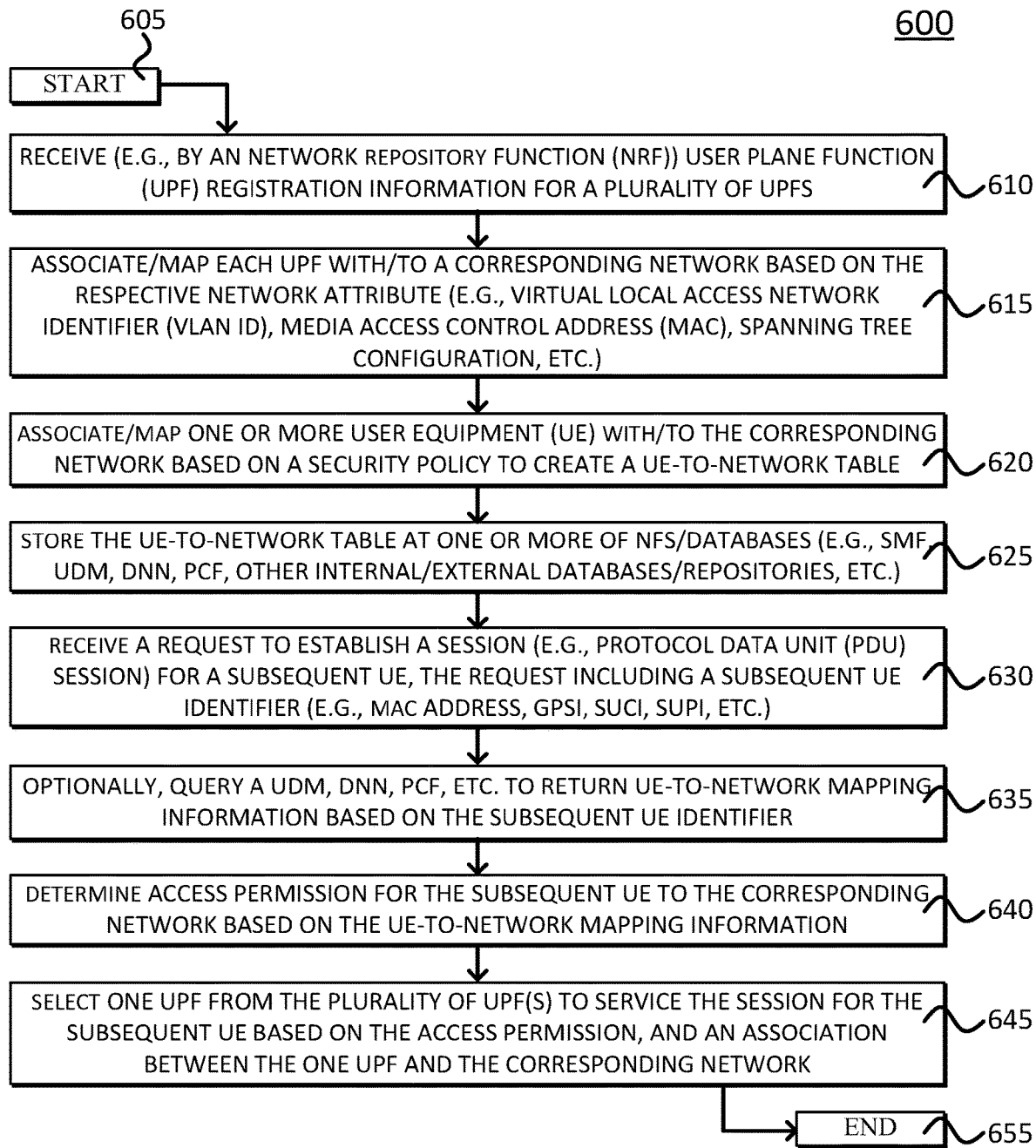
FIG. 6 illustrates an example simplified procedure for selecting a UPF in a communication network, in accordance with one or more examples of the UPF selection procedure.

FIG. 6 illustrates an example simplified procedure 600 for selecting a User Plane Function (UPF). As shown, procedure 600 can represent operations performed by a Network Function (NF) (e.g., a network entity), either individually or in cooperation with other NFs (e.g., SMF 325, PCF 345, UDM 360, and so on) that form the 5G core network (e.g., SBA 132).

Procedure 600 begins at step 605 and continues on to step 610 where, as discussed above, the NF (e.g., here, the NRF) receive User Plane Function (UPF) initial registration information for a plurality of UPFs. As mentioned, this initial registration information including a respective layer 2 (L2) network attribute for each UPF.

Next, at step 615, the NF associates or maps each UPF to the corresponding network based on the respective network attribute (e.g., VLAN ID, Media Access Control Address (MAC), spanning tree configuration, etc.)).

In addition, at step 620, the NF associates or maps one or more User Equipment (UE) with/to the corresponding network based on a security policy. This UE-to-network mapping may take the form of a UE/network table 362 (discussed above), and it may be stored, at step 625, by a Unified Data Management (UDM) entity, a Unified Data Repository (UDR), Data Network Name (DNN), an AAA server, as part of a new NF in SBA 132, and/or locally stored by the SMF/PCF. Notably, the UE/network table 362 maps a UE identifier (e.g., MAC address, a General Public Subscription Identifier (GPSI), a Subscriber Concealed Identifier (SUCI), or a Subscriber Permanent Identifier (SUPI), and the like) to a given network (e.g., VLAN ID).

At step 630, the NF (which can include the SMF) receives a request to establish a session for a subsequent UE. The session can include a Protocol Data Unit (PDU) session, and the request can include a subsequent UE identifier (e.g., Media Access Control (MAC) address, a General Public Subscription Identifier (GPSI), a Subscriber Concealed Identifier (SUCI), or a Subscriber Permanent Identifier (SUPI), etc.).

Next, the NF can optionally query another network entity and/or database to return the UE-to-network mapping information based on the subsequent UE identifier. For example, as discussed with respect to the signaling diagrams shown in FIGS. 5A, 5B, and 5C, the NF (e.g., SMF 325) queries the UDM, DNN, NRF, PCF, other databases/repositories, etc. to return UE-to-network mapping information (e.g., from UE/network table 362) based on the subsequent UE identifier. It is also appreciated, in some examples, the NF can store the UE-to-network mapping information locally and need not perform this optional step.

The NF also determines, at step 640, whether the subsequent UE has access permission to the corresponding network based on the UE-to-network mapping information.

At step 645, the NF selects one UPF from a plurality of UPFs to serve the session for the subsequent UE based on the access permission and the mapping or association between the one UPF and the corresponding network. For example, similar to the above-discussed operations at step 518 for the signaling diagrams shown in FIGS. 5A-5C, the NF (e.g., SMF 325) determines the subsequent UE has proper access permission to the corresponding network at step 640, and further determines selects a UPF associated with/mapped to the corresponding network. As mentioned, each UPF provides a network attribute (e.g. VLAN ID) as part of an initial registration process. This network attribute is further used for mapping each UPF to respective network(s) (e.g., step 615). During a subsequent discovery process, SMF 325, determines and selects the appropriate UPF (e.g., UPF 515) that serves the corresponding network based on the mapping information between the UPF and the corresponding network (e.g., VLAN ID).

Procedure 600 subsequently ends at step 655, but may return to step 610 where the NF receives UPF registration information for a plurality of UPFs.

Procedure 600 illustrates exemplary operations for selecting a UPF, and it is appreciated any number of additional steps may be included (or excluded) as appropriate (e.g., additional steps described by 3GPP TS 23.502, etc.). In addition, it should be noted that certain steps within procedure 600 may be optional, and further, the steps shown in FIG. 6 are merely example steps for illustration. Further, while a particular order of the steps is shown, this ordering is merely illustrative, and any suitable arrangement of the steps may be utilized without departing from the scope of the embodiments herein.

The techniques described herein, therefore, provide new operations to select a User Plane Function (UPF) in a telecommunication network. These techniques enhance UPF selection by associating L2 requirements for a UE and PDU supporting Ethernet or unstructured PDU. These techniques particularly help improve end-to-end security, since access to the data network is only granted access to a data network after appropriate UPF selection. Put differently, rather than trust a UE request to access a data network (e.g., from the UE itself) and assign a UPF based on the UE request, the techniques disclosed herein select an appropriate UPF to serve the UE and data network based on prior-defined security policies stored in a database or repository (e.g., stored by a UDM, UDR, PCF, etc.). Further, the disclosed UPF selection techniques may be used to help deploy applications that require Ethernet, unstructured PDU for M2M, IoT applications, and so on.

While there have been shown and described illustrative examples of the UPF selection techniques and corresponding operations in a specific network context (e.g., a mobile core network for a 5G network), it is to be understood that various other adaptations and modifications may be made within the spirit and scope of the embodiments herein. For example, the embodiments and operations disclosed herein have been described with respect to certain devices, NFs, interfaces, and systems, however it is appreciated that such embodiments are provided for purposes of example, not limitation and that the UPF selection techniques disclosed herein can be incorporated as part of existing wireless networks.

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   receiving, by a Network Function (NF), registration information for a plurality of user plane functions (UPFs);
   associating, by the NF, one or more User Equipment (UE) and one or more UPFs with a corresponding network, the one or more UE and the one or more UPFs being associated with the corresponding network based on at least one of a network attribute or a policy;
   mapping the association of the one or more UEs and the one or more UPFs with the corresponding network in one or more tables; and
   selecting, by the NF from the one or more tables, the one or more UPFs from the plurality of UPFs to service a session for a subsequent UE, the one or more UPFs being selected based on the associating of the one or more UPFs with the corresponding network.

2. The method of claim 1, further comprising:
   associating, by the NF, the one or more UE via a UE identifier to the corresponding network to create a UE-to-network table of the one or more tables;
   receiving, by the NF, a request to establish a session for the subsequent UE, the request including a subsequent UE identifier; and
   determining, by the NF, an access permission for the subsequent UE to access the corresponding network based on the subsequent UE identifier and the UE-to-network table of the one or more tables.

3. The method of claim 2, wherein determining the access permission further comprises querying to lookup the access permission based on the UE identifier and the UE-to-network table of the one or more tables.

4. The method of claim 2, wherein the UE identifier includes one or more of a Media Access Control (MAC) address, a General Public Subscription Identifier (GPSI), a Subscriber Concealed Identifier (SUCI), or a Subscriber Permanent Identifier (SUPI).

5. The method of claim 1, wherein the network attribute includes at least one of a broadcast domain, a Virtual Local Access Network (VLAN) identifier, a Media Access Control (MAC) address, or a spanning tree configuration.

6. The method of claim 1, wherein receiving the registration information further comprises receiving, by a Network Repository Function (NRF), the UPF registration information.

7. The method of claim 1, wherein associating each UPF with the corresponding network further comprises mapping each UPF with the corresponding network in a UPF-to-network table of the one or more tables, and wherein selecting the one UPF further comprises determining the corresponding network from the UE-to-network table of the one or more tables, and determining the one UPF from the UPF-to-network table of the one or more tables.

8. A system comprising:
   at least one processor; and
   at least one memory storing instructions, which when executed cause the at least one processor to:
   receive registration information for a plurality of user plane functions (UPF s);
   associate one or more User Equipment (UE) and one or more UPFs with a corresponding network, the one or more UE and the one or more UPFs being associated with the corresponding network based on at least one of a network attribute or a policy; and
   map the association of the one or more UEs and the one or more UPFs with the corresponding network in one or more tables;

select, from the one or more tables, the one or more UPFs from the plurality of UPFs to service a session for a subsequent UE, the one or more UPFs being selected based on the associating of the one or more UPFs with the corresponding network.

9. The system of claim 8, further comprising instructions, which when executed by the at least one processor, causes the at least one processor to:
associate the one or more UE via a UE identifier to the corresponding network to create a UE-to-network table of the one or more tables;
receive a request to establish a session for the subsequent UE, the request including a subsequent UE identifier; and
determine an access permission for the subsequent UE to access the corresponding network based on the subsequent UE identifier and the UE-to-network table.

10. The system of claim 9, further comprising instructions, which when executed by the at least one processor, causes the at least one processor to:
query to lookup the access permission based on the UE identifier and the UE-to-network table of the one or more tables.

11. The system of claim 9, wherein the UE identifier includes one or more of a Media Access Control (MAC) address, a General Public Subscription Identifier (GPSI), a Subscriber Concealed Identifier (SUCI), or a Subscriber Permanent Identifier (SUPI).

12. The system of claim 8, wherein the network attribute includes at least one of a broadcast domain, a Virtual Local Access Network (VLAN) identifier, a Media Access Control (MAC) address, or a spanning tree configuration.

13. The system of claim 8, further comprising instructions, which when executed by the at least one processor, causes the at least one processor to:
receive, by a Network Repository Function (NRF), the UPF registration information.

14. The system of claim 8, further comprising instructions, which when executed by the at least one processor, causes the at least one processor to:
map each UPF with the corresponding network in a UPF-to-network table of the one or more tables;
determine the corresponding network from the UE-to-network table of the one or more tables; and
determine the one UPF from the UPF-to-network table of the one or more tables.

15. At least one non-transitory computer readable medium storing instructions, which when executed cause the at least one processor to:
receive registration information for a plurality of user plane functions (UPFs);
associate one or more User Equipment (UE) and one or more UPFs with a corresponding network, the one or more UE and the one or more UPFs being associated with the corresponding network based on at least one of a network attribute or a policy; and
map the association of the one or more UEs and the one or more UPFs with the corresponding network in one or more tables;
select, from the one or more tables, the one or more UPFs from the plurality of UPFs to service a session for a subsequent UE, the one or more UPFs being selected based on the associating of the one or more UPFs with the corresponding network.

16. The at least one non-transitory computer readable medium of claim 15, further comprising instructions, which when executed by the at least one processor, causes the at least one processor to:
associate the one or more UE via a UE identifier to the corresponding network based on the to create a UE-to-network table of the one or more tables;
receive a request to establish a session for the subsequent UE, the request including a subsequent UE identifier; and
determine an access permission for the subsequent UE to access the corresponding network based on the subsequent UE identifier and the UE-to-network table of the one or more tables.

17. The at least one non-transitory computer readable medium of claim 16, further comprising instructions, which when executed by the at least one processor, causes the at least one processor to:
query to lookup the access permission based on the UE identifier and the UE-to-network table of the one or more tables.

18. The at least one non-transitory computer readable medium of claim 16, wherein the UE identifier includes one or more of a Media Access Control (MAC) address, a General Public Subscription Identifier (GPSI), a Subscriber Concealed Identifier (SUCI), or a Subscriber Permanent Identifier (SUPI).

19. The at least one non-transitory computer readable medium of claim 15, further comprising instructions, which when executed by the at least one processor, causes the at least one processor to:
receive, by a Network Repository Function (NRF), the UPF registration information.

20. The at least one non-transitory computer readable medium of claim 15, further comprising instructions, which when executed by the at least one processor, causes the at least one processor to:
map each UPF with the corresponding network in a UPF-to-network table of the one or more tables;
determine the corresponding network from the UE-to-network table of the one or more tables; and
determine the one UPF from the UPF-to-network table of the one or more tables.

* * * * *